(12) United States Patent
Cormier

(10) Patent No.: US 9,154,929 B2
(45) Date of Patent: Oct. 6, 2015

(54) TRANSMISSION OF THE PDP CONTEXT ACTIVATION REJECTION CAUSE CODES TO THE UICC

(75) Inventor: Jean-Philippe Cormier, Ottawa (CA)

(73) Assignee: BlackBerry Limited, Waterloo, Ontario (CA)

( * ) Notice: Subject to any disclaimer, the term of this patent is extended or adjusted under 35 U.S.C. 154(b) by 60 days.

(21) Appl. No.: 13/451,125

(22) Filed: Apr. 19, 2012

(65) Prior Publication Data
US 2012/0275312 A1 Nov. 1, 2012

Related U.S. Application Data

(63) Continuation of application No. PCT/CA2011/050254, filed on Apr. 26, 2011.

(51) Int. Cl.
| | |
|---|---|
| G01R 31/08 | (2006.01) |
| G06F 11/00 | (2006.01) |
| H04J 1/16 | (2006.01) |
| H04J 3/14 | (2006.01) |
| H04W 4/20 | (2009.01) |
| H04W 4/00 | (2009.01) |
| H04W 76/02 | (2009.01) |

(52) U.S. Cl.
CPC ............... *H04W 4/20* (2013.01); *H04W 4/003* (2013.01); *H04W 76/022* (2013.01); *H04W 76/027* (2013.01)

(58) Field of Classification Search
CPC .................................................. H04W 76/027
USPC ......................................................... 370/241
IPC ........... H04W 4/20, 88/02, 76/027; H04L 29/06
See application file for complete search history.

(56) References Cited

U.S. PATENT DOCUMENTS

| | | |
|---|---|---|
| 6,591,116 B1 | 7/2003 | Laurila et al. |
| 7,596,150 B2 | 9/2009 | Baird et al. |
| 8,447,836 B2 | 5/2013 | Mahalal et al. |
| 8,489,143 B2 | 7/2013 | Dong |
| 8,503,376 B2 | 8/2013 | Cha et al. |
| 8,606,319 B2 | 12/2013 | Ali et al. |
| 8,666,385 B2 | 3/2014 | Li |
| 2003/0045290 A1 | 3/2003 | Tuohimetsa et al. |

(Continued)

FOREIGN PATENT DOCUMENTS

| | | |
|---|---|---|
| CN | 101043744 A | 9/2007 |
| CN | 101785357 | 7/2010 |

(Continued)

OTHER PUBLICATIONS

3GPP (CTS 31.111 V10.1.0 (Jan. 2011)), USIM application toolkit (USAT) (release 10).*

(Continued)

*Primary Examiner* — Maharishi Khirodhar
(74) *Attorney, Agent, or Firm* — Fish & Richardson P.C.

(57) ABSTRACT

A method and system for introducing support for SM rejections in a USAT network rejection event including an APN. The method and system provide the UICC with all PDP Context activation rejection cause codes received by the ME and their respective APNs. Such a method and system allows the UICC to monitor all the rejections to intelligently select an appropriate APN to activate using its Open channel command.

20 Claims, 8 Drawing Sheets

(56) References Cited

U.S. PATENT DOCUMENTS

| | | | |
|---|---|---|---|
| 2003/0073440 | A1 | 4/2003 | Mukherjee et al. |
| 2004/0103157 | A1 | 5/2004 | Requena et al. |
| 2004/0243680 | A1 | 12/2004 | Mayer |
| 2005/0021875 | A1 | 1/2005 | Bouthemy et al. |
| 2005/0105511 | A1* | 5/2005 | Poikselka ............... 370/352 |
| 2005/0259673 | A1 | 11/2005 | Lu et al. |
| 2006/0155814 | A1 | 7/2006 | Bennett et al. |
| 2006/0268904 | A1 | 11/2006 | Bae et al. |
| 2007/0060097 | A1 | 3/2007 | Edge et al. |
| 2007/0207798 | A1 | 9/2007 | Talozi et al. |
| 2007/0239857 | A1 | 10/2007 | Mahalal et al. |
| 2008/0293407 | A1* | 11/2008 | Cormier et al. ............ 455/433 |
| 2008/0301785 | A1 | 12/2008 | Beyer et al. |
| 2009/0055899 | A1 | 2/2009 | Deshpande et al. |
| 2009/0068996 | A1 | 3/2009 | Bakker et al. |
| 2009/0093249 | A1 | 4/2009 | Zhu et al. |
| 2009/0209232 | A1 | 8/2009 | Cha et al. |
| 2009/0213794 | A1 | 8/2009 | Rotsten et al. |
| 2009/0215454 | A1 | 8/2009 | Przybysz et al. |
| 2009/0215490 | A1 | 8/2009 | Lee et al. |
| 2009/0235299 | A1 | 9/2009 | Astrom et al. |
| 2009/0252309 | A1 | 10/2009 | Beyer et al. |
| 2009/0319906 | A1 | 12/2009 | White et al. |
| 2010/0081434 | A1 | 4/2010 | Ahluwalia |
| 2010/0084465 | A1 | 4/2010 | Jolivet |
| 2010/0085937 | A1 | 4/2010 | Pressley et al. |
| 2010/0136970 | A1 | 6/2010 | Mui et al. |
| 2010/0138525 | A1 | 6/2010 | Dong |
| 2010/0177769 | A1 | 7/2010 | Barriga et al. |
| 2010/0227588 | A1 | 9/2010 | Bradley |
| 2010/0248748 | A1 | 9/2010 | Dong |
| 2010/0312897 | A1 | 12/2010 | Allen et al. |
| 2010/0329243 | A1 | 12/2010 | Buckley et al. |
| 2011/0028126 | A1 | 2/2011 | Lim et al. |
| 2011/0040836 | A1 | 2/2011 | Allen et al. |
| 2011/0055565 | A1 | 3/2011 | Murakami et al. |
| 2011/0119357 | A1 | 5/2011 | Lindholm et al. |
| 2011/0136471 | A1 | 6/2011 | Chen et al. |
| 2011/0319133 | A1 | 12/2011 | Dong |
| 2012/0106570 | A1 | 5/2012 | Li |
| 2012/0115477 | A1 | 5/2012 | Ali et al. |
| 2012/0115542 | A1 | 5/2012 | Griffin et al. |
| 2012/0142332 | A1 | 6/2012 | Li |
| 2012/0166654 | A1 | 6/2012 | Ali et al. |
| 2012/0238244 | A1 | 9/2012 | Ennesser et al. |
| 2013/0028179 | A1 | 1/2013 | Sedlacek et al. |
| 2014/0010148 | A1 | 1/2014 | Ali et al. |

FOREIGN PATENT DOCUMENTS

| | | |
|---|---|---|
| EP | 1059822 | 12/2000 |
| EP | 1995986 | 11/2008 |
| EP | 2028910 | 2/2009 |
| EP | 2028910 A1 * | 2/2009 |
| EP | 2182430 | 5/2010 |
| JP | 2001-016634 | 1/2001 |
| JP | 2010-057113 | 3/2010 |
| WO | 2005/115028 | 12/2005 |
| WO | WO 2005115028 A1 * | 12/2005 |
| WO | 2010/072243 | 7/2010 |

OTHER PUBLICATIONS

3GPP (TS 31.111 V10.1.0 (Jan. 2011)), USIM application toolkit (USAT) (release 10).*

3GPP, TSG-WG1 Meeting #67, C1-105178, Barselona spain, Oct. 11-15, 2010.*

Nokia Siemens Networks et al.; "Rejection Due to Per APN Congestion"; 3GPP TSG-CT WG1 Meeting #67, C1-105178; Barcelona, Spain, Nov. 19, 2010; 10 pages.

Office Action issued in U.S. Appl. No. 13/352,985 on Dec. 4, 2012; 13 pages.

Office Action issued in U.S. Appl. No. 13/352,985 on Mar. 5, 2013; 9 pages.

3GPP TS 31.111 V10.2.0 (Apr. 2011); "3rd Generation Partnership Project; Technical Specification Group Core Network and Terminals; Universal Subscriber Identity Module (USIM) Application Toolkit (USAT) (Release 10)"; Apr. 2011; pp. 1-115.

3GPP TS 31.111 V10.3.0 (Jun. 2011); "3rd Generation Partnership Project; Technical Specification Group Core Network and Terminals; Universal Subscriber Identity Module (USIM) Application Toolkit (USAT) (Release 10)"; Jun. 2011; pp. 1-116.

ETSI TS 102 223 V10.2.0 (Mar. 2011); "Smart Cards; Card Application Toolkit (CAT) (Release 10)"; Mar. 2011; 226 pages.

Gemalto, et al.; "BIP Open Channel for IMS"; 3GPP TSG-CT6#53 (C6-090430); Beijing, China; Nov. 10-13, 2009; 14 pages.

Research In Motion UK Limited; "Introduction of the IARI Based Registration Event"; 3GPP TSG CT6 Meeting #59 (C6-110124); Salt Lake City, US; Jan. 22-25, 2011; 20 pages.

Office Action issued in U.S. Appl. No. 13/352,985 on Apr. 2, 2012; 9 pages.

Office Action issued in U.S. Appl. No. 13/353,042 on May 17, 2012; 13 pages.

Office Action issued in U.S. Appl. No. 13/353,042 on Jul. 27, 2012; 12 pages.

Extended European Search Report issued in European Application No. 12156767.1 on Sep. 19, 2012; 9 pages.

Extended European Search Report issued in European Application No. 12165685.4 on Sep. 6, 2012; 6 pages.

International Search Report and Written Opinion of the International Searching Authority issued in International Application No. PCT/IB2010/056064 on Aug. 29, 2011; 9 pages.

International Search Report and Written Opinion of the International Searching Authority issued in International Application No. PCT/US2010/053374 on Jul. 22, 2011; 7pages.

International Search Report and Written Iopinion of the International Searching Authority issued in International Application No. PCT/CA2011/050254 on Jan. 6, 2012; 9 pages.

Notice of Allowance issued in U.S. Appl. No. 13/384,709 on Jul. 31, 2013; 13 pages.

Communication Pursuant to Article 94(3) EPC issued in European Application No. 12165685.4 on Sep. 26, 2013; 4 pages.

Communication Pursuant to Article 94(3) EPC issued in European Application No. 12165685.4 on May 16, 2013; 3 pages.

Office Action issued in U.S. Appl. No. 13/353,042 on Oct. 23, 2013; 16 pages.

International Preliminary Report on Patentability under Chapter I issued in International Application No. PCT/CA2011/050254 on Nov. 7, 2013; 7 pages.

Communication under Rule 71(3) EPC issued in European Application No. 12165685.4 on Feb. 20, 2014.

Office Action issued in Chinese Application No. 201210127047.5 on May 6, 2014; 5 pages. No translation.

3GPP CT6 #57; "Change Request"; C6-100638; Lisbon, Portugal; Nov. 16-19, 2010; 9 pages.

3GPP TSG CT WG6 Ad-hoc #127; "Change Request"; C6a-100304; Conf. Call; Nov. 8, 2010; 6 pages.

Rosenberg, J. et al.; Indicating User Agent Capabilities in the Session Initiation Protocol (SIP); Network Working Group Request for Comments: 3840; 2004; 36 pages.

Partial Search Report issued in European Application No. 12162746.7 on Jul. 29, 2014; 8 pages.

Office Action issued in Japanese Application No. 2013-545516 issued on Jun. 17, 2014; 7 pages.

Office Action issued in Japanese Application No. 2013-534882 on Jun. 30, 2014; 10 pages.

Office Action issued in Korean Application No. 10-2013-7018741 on Jun. 13, 2014; 3 pages.

Office Action issued in U.S. Appl. No. 13/384,704 on Nov. 20, 2014.

United States Office Action in U.S. Appl. No. 13/384,704, dated Mar. 30, 2015, 21 pages.

Extended European Search Report in European Application No. 121627467.7, dated Dec. 23, 2014, 12 pages.

3GPP TSG CT WG6 Ad-hoc #126; "Change Request"; C6a-100203; Conf. Call: Oct. 22, 2010, 6 pages.

ST-Ericsson, Research in Motion, "Reference update and restoration of the Terminal Profile's bytes with letter class," 3GPP CT6 #57 C6-100638, Nov. 18, 2010.

* cited by examiner

TRANSMISSION OF THE PDP CONTEXT ACTIVATION REJECTION CAUSE CODES TO THE UICC

CROSS-REFERENCE TO RELATED APPLICATIONS

This application is a continuation of and claims the benefit of PCT Application Serial No. PCT/CA2011/050254, entitled "Transmission of the PDP Context Activation Rejection Cause Codes to the UICC," filed on Apr. 26, 2011, the entire contents of which is hereby incorporated by reference.

BACKGROUND OF THE INVENTION

1. Field of the Invention

The present invention is directed in general to communications systems and methods for operating same, and more particularly to communication of PDP context activation rejection cause codes and Configure-Request Error Codes to a UICC.

2. Description of the Related Art

In known wireless telecommunications systems, transmission equipment in a base station or access device transmits signals throughout a geographical region known as a cell. As technology has evolved, more advanced equipment has been introduced that can provide services that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). Another example of advanced equipment includes evolved High Rate Packet Data (eHRPD) type equipment such as that which conforms to the 3GPP2 X.s0057 v3.0 specification. An access device is any component, such as a traditional base station or an LTE eNB (Evolved Node B), that can provide a user agent (UA), such as user equipment (UE) or mobile equipment (ME), with access to other components in a telecommunications system.

In mobile communication systems such as an E-UTRAN, the access device provides radio accesses to one or more UAs. The access device comprises a packet scheduler for allocating uplink (UL) and downlink (DL) data transmission resources among all the UAs communicating to the access device. The functions of the scheduler include, among others, dividing the available air interface capacity between the UAs, deciding the resources (e.g. sub-carrier frequencies and timing) to be used for each UA's packet data transmission, and monitoring packet allocation and system load. The scheduler allocates physical layer resources for physical downlink shared channel (PDSCH) and physical uplink shared channel (PUSCH) data transmissions, and sends scheduling information to the UAs through a control channel. The UAs refer to the scheduling information for the timing, frequency, data block size, modulation and coding of uplink and downlink transmissions.

In certain mobile communication systems, there is a requirement for a universal integrated circuit card (UICC) application (e.g., a subscriber identity module (SIM), an Internet Protocol (IP) multimedia subsystem (IMS) SIM (ISIM), and a universal terrestrial radio access network (UTRAN) SIM (USIM)) a removable user identity module (RUIM) or a code division multiple access (CDMA) subscriber identity module (CSIM).

In certain known mobile communication systems, the UICC can use USIM Application Toolkit (USAT) commands (e.g., Open/Close Channel commands) to trigger a Packet Data Network (PDN) Connectivity request or an activate packet data protocol (PDP) Context request on the ME. Use of these commands enables the UICC to send IP data to the network on an access point name (APN) of its choosing. This end-to-end IP data session establishment can be used for features like bearer independent protocol (BIP) which provides the UICC with an IP interface to perform over-the-air updates. This interface is more efficient than, e.g., a short message service (SMS) over the air (OTA) mechanism and also allows for larger updates. FIG. 1, labeled Prior Art, shows an example of a UICC interaction with a network when performing USAT commands.

In certain known mobile communication systems, the UICC can use CDMA Card Application Toolkit (CCAT) commands (e.g., Open/Close Channel commands) to trigger a 3GPP2 VSNCP Configure-Request on the ME. Use of these commands enables the UICC to send IP data to the network on an access point name (APN) of its choosing. This end-to-end IP data session establishment can be used for features like bearer independent protocol (BIP) which provides the UICC with an IP interface to perform over-the-air updates. This interface is more efficient than, e.g., a short message service (SMS) over the air (OTA) mechanism and also allows for larger updates.

With the arrival of Machine to Machine M2M, or Machine type communication (MTC) there is speculation that processing functionality for the M2M device will reside inside the UICC and therefore it is likely that the UICC will require more input about its interactions from the network.

An issue which relates to Open and Close channel is that the UICC is not aware of the network failures that may occur during the PDP Context activation procedure (see e.g., 3GPP TS 24.008) or during a PDN Connectivity procedure (see e.g., 3GPP TS 24.301). In some systems, poorly implemented UICC applications could attempt PDP Context or PDN Connectivity retries that result in a negative impact to the network. For example, some event occurs that triggers all the cards deployed on the network to request a data session for an OTA update. The PDP context or PDN Connectivity may be rejected based on lack of capacity. If this condition occurs, the UICC application should back-off its retry attempts to allow the system to recover from this sudden rise in data activity. FIG. 2, labeled Prior Art, shows an example of a UICC retrying a PDP context activation procedure or PDN Connectivity procedure that may impact the network.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
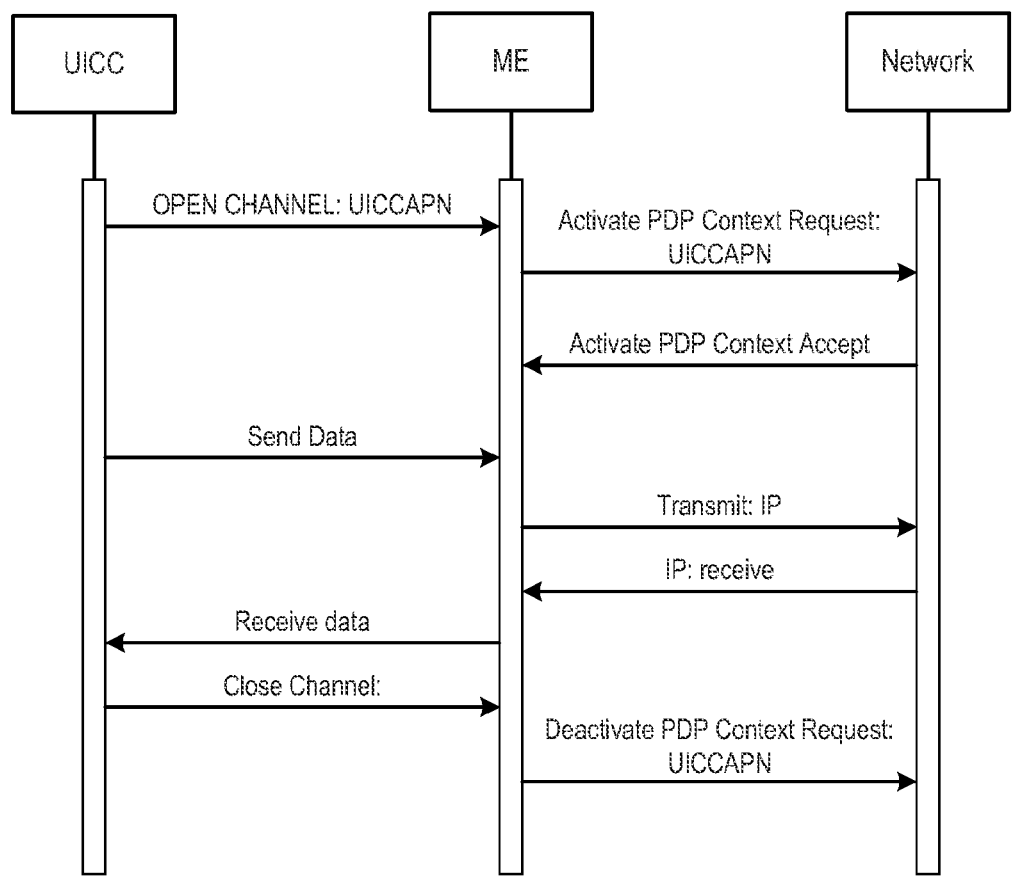
FIG. 1, labeled Prior Art, shows a flow diagram of a UICC interaction with a network.
Figure 2:
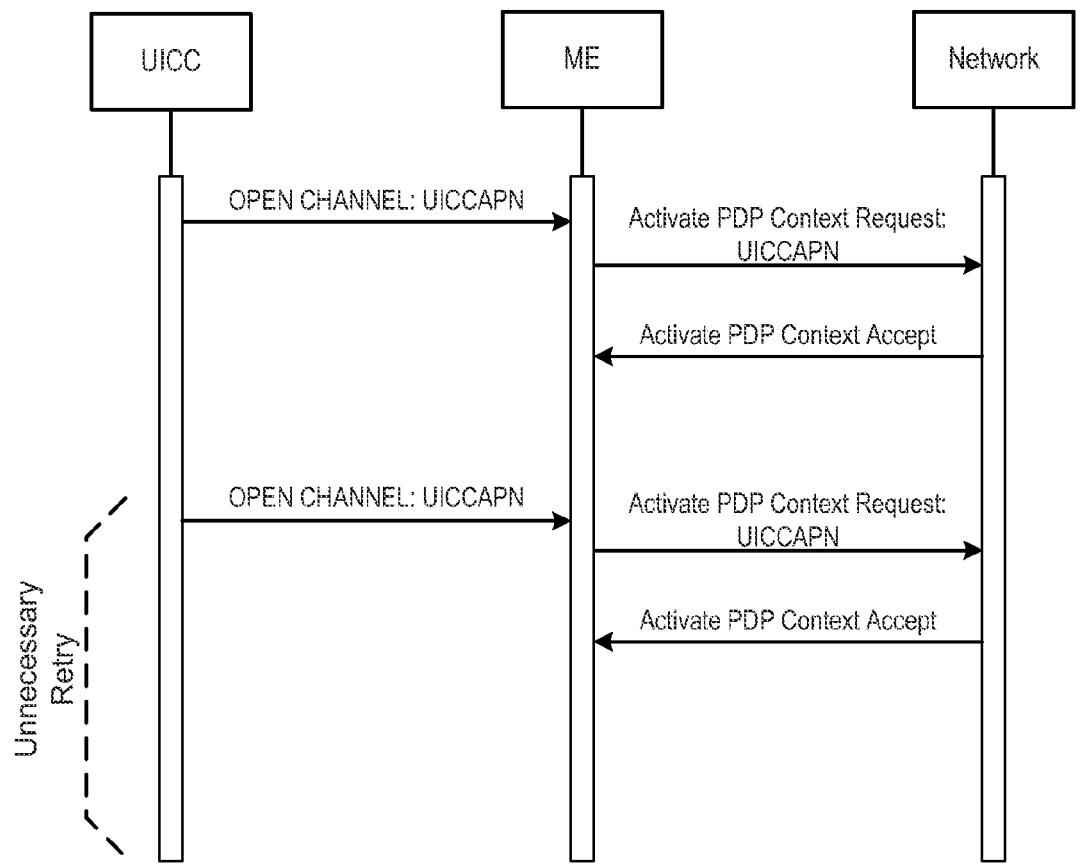
FIG. 2, labeled Prior Art, shows a flow diagram of a UICC retrying a PDP activation that may impact a network.

A method and system are provided for introducing support for SM (Session Management) rejections in a USAT network rejection event including an APN. The method and system provide the UICC with all the SM cause included in the ACTIVATE PDP CONTEXT REJECT message or the Evolved Session Management (ESM) cause included in the PDN CONNECTIVITY REJECT message received by the ME and their respective APNs. Such a method and system allows the UICC to monitor all the rejections to intelligently select an appropriate APN to include in ACTIVATE PDP CONTEXT REQUEST message or a PDN CONNECTIVITY REQUEST message using its Open Channel command.

In certain embodiments, the method and system introduces support for SM cause information element in a USAT network rejection event. This support can be used in MEs that do not have a respective APN. In this case, the ME provides the SM cause included in the ACTIVATE PDP CONTEXT REJECT message or the ME provides the ESM cause included in the PDN CONNECTIVITY REJECT message.

In other embodiments, the method and system uses a terminal response to indicate to the UICC that there has been a specific problem with an Open Channel command. In this embodiment, during an Open Channel procedure, the ME provides a Terminal Response to acknowledge the Open Channel command. In this embodiment, the ME includes the SM Cause included in the ACTIVATE PDP CONTEXT REJECT message or the ME provides the ESM cause included in the PDN CONNECTIVITY REJECT message received from the network to a Terminal Response message.

In certain embodiments, a method and system are provided for introducing support for 3GPP2 VSNCP Configure-Request network rejection event including an APN. This support provides the UICC with all Error Code included in 3GPP2 VSNCP Configure-Reject message received by the ME and their respective APNs. Such a method and system allows the UICC to monitor all the rejections to intelligently select an appropriate APN to include in 3GPP2 VSNCP Configure-Request message using its Open Channel command In certain embodiments, the method and system introduces support for an error code in a CCAT or USAT network rejection event. This support can be used in MEs that do not have a respective APN. In this case, the ME provides the Error Code VSNCP Configuration Option included in the 3GPP2 VSNCP Configure-Reject message.

In other embodiments, the method and system uses a terminal response to indicate to the UICC that there has been a specific problem with an Open Channel command. In this embodiment, during an Open Channel procedure, the ME provides a Terminal Response to acknowledge the Open Channel command. In this embodiment, the ME includes the Error Code VSNCP Configuration Option included in the 3GPP2 VSNCP Configure-Reject message.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Figure 3:
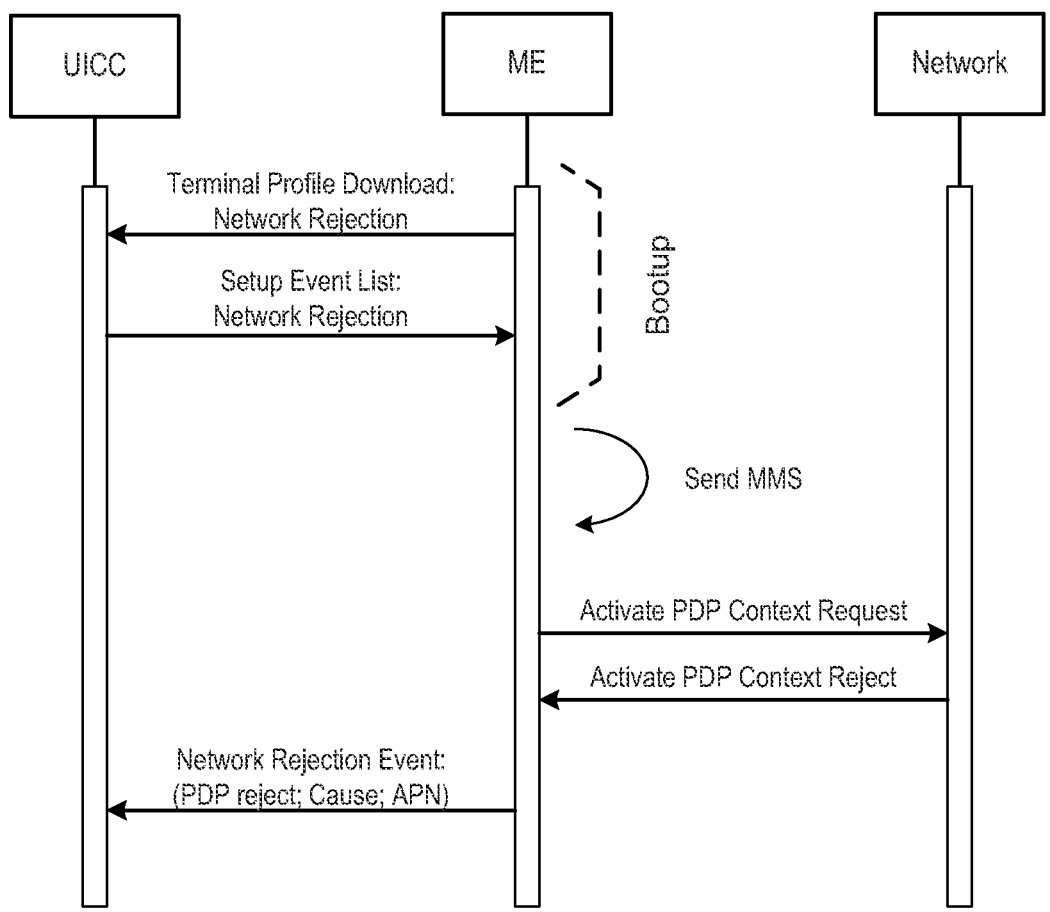
FIG. 3 shows a flow diagram of an ME being notified of a PDP context activation rejection triggered by an MMS session.
Figure 4:
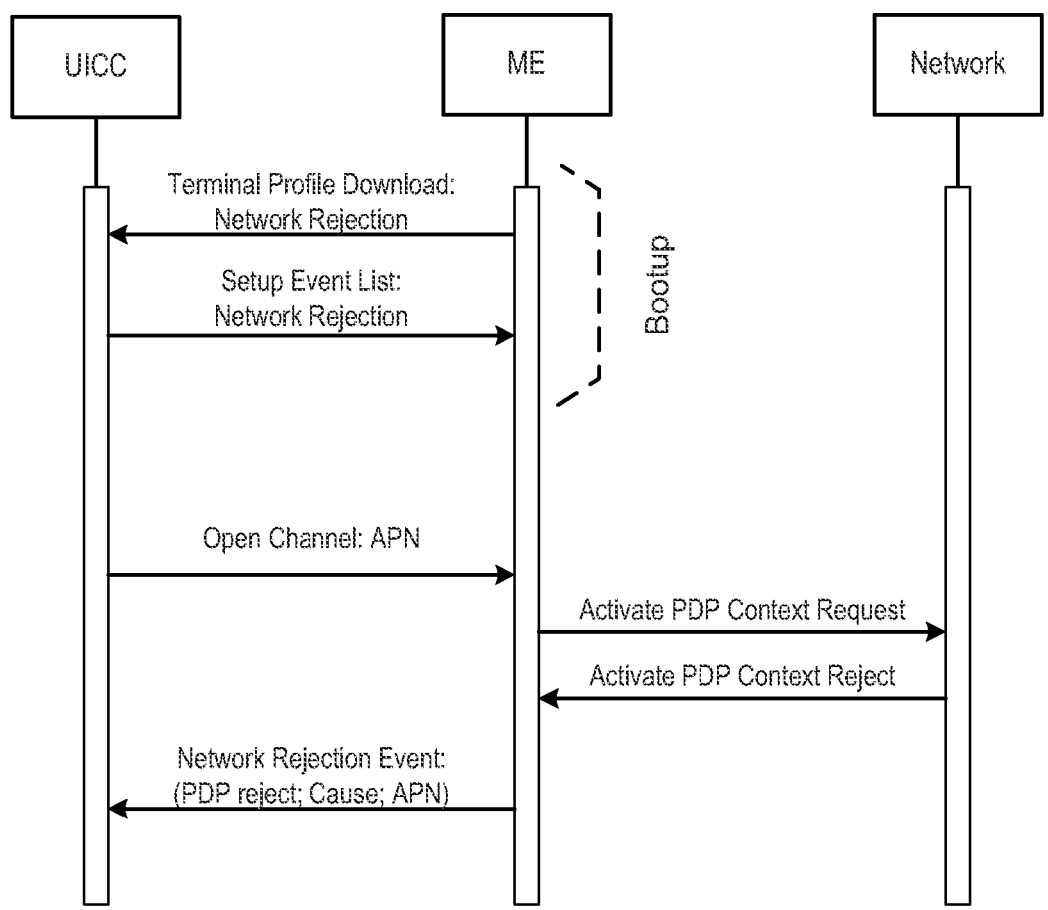
FIG. 4 shows a flow diagram of an ME notifying a UICC of a PDP context activation rejection following an open channel command.

Referring now to FIGS. 3 and 4, flow diagrams of an ME notifying a UICC of an ACTIVATE PDP CONTEXT REJECT message or PDN CONNECTIVITY REJECT message triggered by an MMS session or due to a failed Open Channel, respectively, are shown. More specifically, in certain embodiments a USAT Network Rejection Event which includes an APN further includes support for session management (SM) network rejections.

In certain embodiments, the UICC discovers support of the network rejection event feature by reading certain bits (e.g., the $5^{th}$ and $7^{th}$ bits) of a byte of a download profile. In certain embodiments, the byte of the Terminal Profile corresponds to a Twenty-fifth byte of the Terminal Profile Download sent by the ME.

Figure 5:
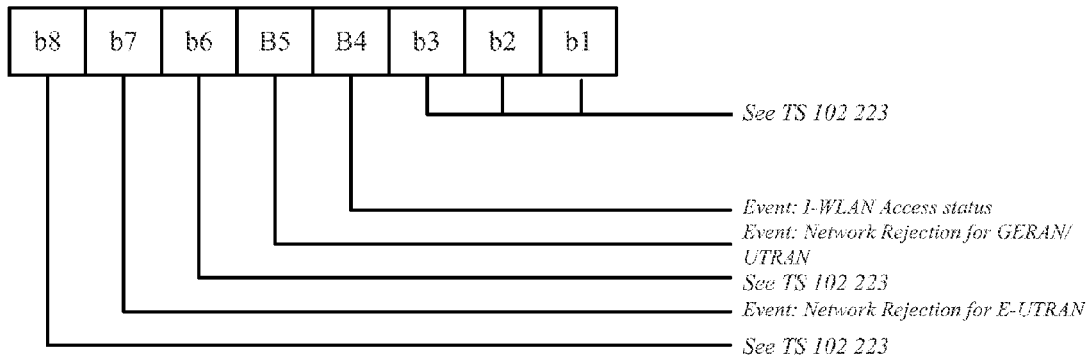
FIG. 5, labeled Prior Art, shows a mapping of a download profile byte which includes Network Rejection event bits.

FIG. 5 shows a mapping of a byte of the Terminal Profile. In this mapping, one bit is used to indicate support for a Network Rejection Event for a GERAN/UTRAN network and one bit is used to indicate support for a Network Rejection Event for an E-UTRAN network.

If the ME indicates support of any radio technology, the UICC proceeds with registering the Network Rejection event in a SETUP EVENT LIST USAT command to enable receipt of the rejection messages.

Referring again to FIG. 4, when the ME receives an ACTIVATE PDP CONTEXT REJECT message or PDN CONNECTIVITY REJECT message from the network and the Network Rejection event is registered on the rejection Event list, the ME sends down a Network Rejection Event to the UICC. In one embodiment this event contains the APN included in the original ACTIVATE PDP CONTEXT REQUEST message or the PDN CONNECTIVITY REQUEST message.

Also, in certain embodiments, all SM cause information element included in REJECT messages received by the ME are sent down to the UICC. In certain other embodiments, the SM cause information elements included in REJECT messages received by the ME that are relevant to the UICC are sent to the UICC. These relevant SM cause information elements include SM cause information elements that were received as part of some UICC Open Channel BIP/IP activity.

More specifically, the UICC uses the SETUP EVENT LIST USAT command to supply a set of events. This set of events becomes the current list of events for which the terminal is to monitor. Any subsequent SET UP EVENT LIST command replaces the current list of events supplied in the previous SET UP EVENT LIST command. The SET UP EVENT LIST command may also be used to remove the entire list of events that is current in the terminal (see e.g., clause 6.6.16 of ETSI TS 102 223 v9.1.0). The list of events provided by the UICC in the last SET UP EVENT LIST command is removed if the terminal is powered off or the UICC is removed or a reset is performed.

When the terminal has successfully accepted or removed the list of events, the terminal sends a TERMINAL RESPONSE (Command performed successfully) message to the UICC. When the terminal is not able to successfully accept or remove the list of events, the terminal sends a TERMINAL RESPONSE (Command beyond terminal's capabilities) message to the UICC. When one of the events in the current list occurs, then the terminal uses the Event Download mechanism to transfer details of the event to the UICC (see e.g., clause 7.5 of ETSI TS 102 223 v9.1.0 and 3GPP 31.111 v. 9.1.0).

For the event list byte coding, a plurality of values are defined in addition to those in ETSI TS 102 223 v. 9.1.0. These values include:

11=I-WLAN Access Status.

12=Network Rejection

15=CSG cell selection

If the Network Rejection event is part of the current event list (as set up by the last SET UP EVENT LIST command, (see e.g., ETSI TS 102 223 v. 9.1.0), then, in the case of GERAN/UTRAN if the terminal receives a LOCATION UPDATING REJECT message or a GPRS ATTACH REJECT message or a ROUTING AREA UPDATE REJECT message or ACTIVATE PDP CONTEXT REJECT message (as defined in TS 24.008) or is unsuccessful in registering to IMS or in the case of E-UTRAN if the terminal receives an ATTACH REJECT message, TRACKING AREA UPDATE REJECT message or PDN CONNECTIVITY REJECT message, the terminal informs the UICC that this event has occurred, by using the ENVELOPE (EVENT DOWNLOAD—Network Rejection Event) command. The direction of the command is ME to UICC and the command header is specified in 3GPP TS 31.101. The structure of the ENVELOPE (EVENT DOWNLOAD —Network Rejection Event) command is set forth in Table 1.

Command parameters/data.

TABLE 1

| Description | Clause | M/O | Min | Length |
| --- | --- | --- | --- | --- |
| Event download tag | 9.1 | M | Y | 1 |
| Length (A + B + (C or D or I or J or K) + E + F + G + H) | — | M | Y | 1 |
| Event list | 8.25 | M | Y | A |
| Device identities | 8.7 | M | Y | B |
| Location Information | 8.19 | C | N | C |
| Routing Area Identification | 8.91 | C | N | D |
| Tracking Area Identification | 8.99 | C | N | I |
| Access Technology | 8.62 | M | Y | E |
| Update/Attach/Activation Type | 8.92 | M | Y | G |
| Rejection Cause Code | 8.93 | M | Y | H |
| PDP Context activation parameters | 8.72 | C | N | J |
| EPS PDN connection activation parameters | 8.98 | C | N | K |

Event list: the Event list data object shall contain only one event (value part of length 1 byte), and terminal shall set the event to:

Network Rejection Event.

Device identities: the terminal shall set the device identities to:

source: Network;

destination: UICC.

Location information: This data object shall only be present when the ME receives a LOCATION UPDATING REJECT message, and shall contain the identification (MCC, MNC, and LAC) of the rejecting network.

Routing Area Identification: This data object shall only be present when the ME receives a GPRS ATTACH REJECT message, a ROUTING AREAD UPDATE REJECT message, ACTIVATE PDP CONTEXT REJECT message and shall contain the identification (MCC, MNC, LAC and RAC) of the rejecting network.

Tracking Area Identification: This data object shall only be present when the ME receives an EMM ATTACH REJECT message, a TRACKING AREA UPDATE REJECT message or a PDN CONNECTIVITY REJECT message and shall contain the identification (MCC, MNC and TAC) of the rejecting network.

Access Technology: This data object shall contain the access technology of the rejecting network Update/Attach Type/Activation: This data object contains the update. attach or activation type that was used in the registration request message.

Rejection Cause Code: This data object contains the cause code value that was received in the registration or reject message.

PDP Context activation parameters: This data object contains the NAS signalling message sent during the PDP context activation. This data object is only present as a result of a GERAN or UTRAN PDP Context activation rejection.

EPS PDN connection activation parameters: This data object contains the NAS signalling message sent during the PDN activation request. This data object is only present as a result of a EUTRAN PDN context activation rejection.

Response parameters/data: None for this type of ENVELOPE command.

The update, attach and activation parameters for the message are set forth in Table 2.

TABLE 2

| Byte(s) | Description | Length |
| --- | --- | --- |
| 1 | Update/Attach/Activation Type Tag | 1 |
| 2 | Length | 1 |
| 3 | Update/Attach/Activation Type | 1 |

Contents:

In the case of GERAN/UTRAN, the terminal shall use this information as a mechanism to indicate to the UICC the location updating type that was sent in the LOCATION UPDATING REQUEST MESSAGE or the update type that was sent in the GPRS ATTACH REQUEST or ROUTING AREA UPDATING REQUEST message or PDP CONTEXT ACTIVATION REQUEST, as specified in TS 24.008.

In the case of E-UTRAN, the terminal shall use this information as a mechanism to indicate to the UICC the EPS attach type that was sent in the ATTACH REQUEST, TRACKING AREA UPDATE REQUEST, PDN CONNECTIVITY REQUEST message, as specified in TS 24.301.

Coding:
- '00'="Normal Location Updating" in the case of a LOCATION UPDATING REQUEST message;
- '01'="Periodic Updating" in the case of a LOCATION UPDATING REQUEST message;
- '02'="IMSI Attach" in the case of a LOCATION UPDATING REQUEST message;
- '03'="GPRS Attach" in the case of a GPRS ATTACH REQUEST message;
- '04'="Combined GPRS/IMSI Attach" in the case of a GPRS ATTACH REQUEST message;
- '05'="RA Updating" in the case of a ROUTING AREA UPDATE REQUEST message;
- '06'="Combined RA/LA Updating" in the case of a ROUTING AREA UPDATE REQUEST message;
- '07'="Combined RA/LA Updating with IMSI Attach" in the case of a ROUTING AREA UPDATE REQUEST message;
- '08'="Periodic Updating" in the case of a ROUTING AREA UPDATE REQUEST message
- '09'="EPS Attach" in the case of an EMM ATTACH REQUEST message
- '0A'="Combined EPS/IMSI Attach" in the case of an EMM ATTACH REQUEST message
- '0B'="TA updating " in the case of an EMM TRACKING AREA UPDATE REQUEST message
- '0C'="Combined TA/LA updating" in the case of an EMM TRACKING AREA UPDATE REQUEST message
- '0D'="Combined TA/LA updating with IMSI attach" in the case of an EMM TRACKING AREA UPDATE REQUEST message
- '0E'="Periodic updating" in the case of an EMM TRACKING AREA UPDATE REQUEST message
- '0F'="PDP Context Activation Request" in the case of an ACTIVATE PDP CONTEXT REQUEST message
- '10'="Dedicated PDN Context Activation Request" in the case of a PDN CONNECTIVITY REQUEST message All other values are reserved for future use The rejection cause code object parameters for the message are set forth in Table 3.

TABLE 3

| Byte(s) | Description | Length |
|---|---|---|
| 1 | Rejection Cause Code Tag | 1 |
| 2 | Length | 1 |
| 3 | Rejection Cause Code (Note) | 1 |

For GERAN/UTRAN, in the case of a LOCATION UPDATING REJECT message, this object contains the Reject Cause as received in the LOCATION UPDATING REJECT message. The Reject Cause is coded in the same manner as the value part of the Reject Cause information element as specified in TS 24.008

For GERAN/UTRAN, in the case of a GPRS ATTACH REJECT message or a ROUTING AREA UPDATE REJECT message, this object contains the GMM Cause as received in the GPRS ATTACH REJECT message or ROUTING AREA UPDATE REJECT message. The GMM Cause is coded in the same manner as the value part of the GMM Cause information element as specified in TS 24.008.

For GERAN/UTRAN, in the case of an ACTIVATE PDP CONTEXT REJECT message, this object contains the SM Cause as received in the ACTIVATE PDP CONTEXT REJECT message. The SM Cause is coded in the same manner as the value part of the SM Cause information element as specified in TS 24.008.

For E-UTRAN, in the case of an EMM ATTACH REJECT message or an EMM TRACKING AREA UPDATE REJECT message, this object contains the EMM Cause received in the EMM ATTACH REJECT message, EMM TRACKING AREA UPDATE REJECT message or PDN CONNECTIVITY REJECT message. The EMM Cause is coded in the same manner as the value part of the EMM Cause information element as specified in TS 24.301.

Figure 6:
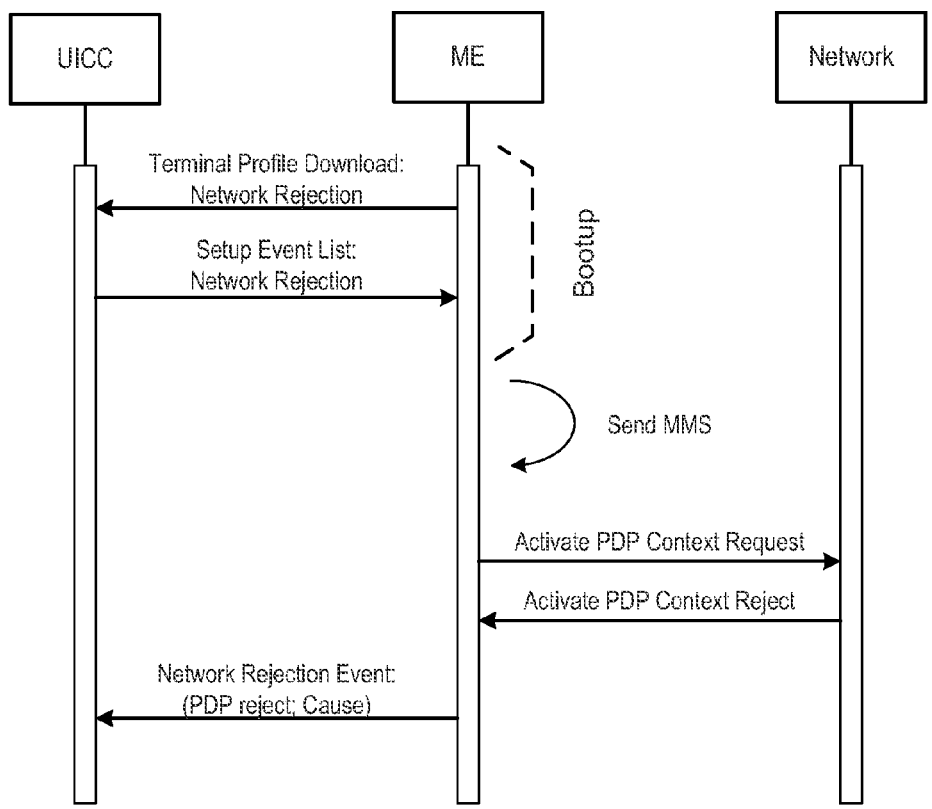
FIG. 6 shows a flow diagram of an ME notifying a UICC of a PDP context activation rejection triggered by an MMS session.

Referring to FIG. 6, in certain embodiments, the USAT Network Rejection Event includes support for SM rejections. In certain embodiments, the UICC discovers support of the network rejection event feature by reading certain bits (e.g., the $5^{th}$ and $7^{th}$ bits) of a byte of a download profile. In certain embodiments, the byte of the download profile corresponds to a Twenty-fifth byte of the profile download sent by the ME.

Referring again to FIG. 5, a mapping of byte of the Terminal Profile. In this mapping, one bit is used to indicate support for a Network Rejection Event for a GERAN/UTRAN network and one bit is used to indicate support for a Network Rejection Event for a E-UTRAN network. More specifically, in this embodiment, the UICC discovers support of the network rejection event feature by reading $5^{th}$ and $7^{th}$ bit of the Twenty-fifth byte of the profile download sent by the ME.

If the event driven information extension is supported in any radio technology, the UICC proceeds with registering the Network Rejection event in a SETUP EVENT LIST USAT command to enable receipt of the rejection messages.

Referring again to FIG. 6, when the ME receives an ACTIVATE PDP CONTEXT REJECT message or PDN CONNECTIVITY REJECT message from the network and the Network Rejection event is registered on the rejection Event list, the ME sends down a Network Rejection Event to the UICC. In certain embodiments, this event contains the APN (and other parameters) included in the original ACTIVATE PDP CONTEXT REQUEST message or the PDN CONNECTIVITY REQUEST message.

Also, in certain embodiments, all SM cause information elements included in REJECT messages received by the ME are sent down to the UICC. In certain other embodiments, the SM cause information elements included in REJECT messages received by the ME that are relevant to the UICC are sent to the UICC. These relevant SM cause information elements include SM cause information elements that were received as part of some from some Open Channel UICC BIP/IP activity.

More specifically, the UICC uses the SETUP EVENT LIST USAT command to supply a set of events. This set of events becomes the current list of events for which the terminal is to monitor. Any subsequent SET UP EVENT LIST command replaces the current list of events supplied in the previous SET UP EVENT LIST command. The SET UP EVENT LIST command may also be used to remove the entire list of events that is current in the terminal (see e.g., clause 6.6.16 of ETSI TS 102 223 v9.1.0). The list of events provided by the UICC in the last SET UP EVENT LIST command is removed if the terminal is powered off or the UICC is removed or a reset is performed.

When the terminal has successfully accepted or removed the list of events, the terminal sends a TERMINAL RESPONSE (Command Performed Successfully) message to the UICC. When the terminal is not able to successfully accept or remove the list of events, the terminal sends a TERMINAL RESPONSE (Command beyond terminal's capabilities) message to the UICC. When one of the events in the current list occurs, then the terminal uses the Event Download mechanism to transfer details of the event to the UICC (see e.g., clause 7.5 of ETSI TS 102 223 v9.1.0 and 3GPP 31.111 v. 9.1.0).

For the event list byte coding, a plurality of values are defined in addition to those in ETSI TS 102 223 v. 9.1.0. These values include:
- 11=I-WLAN Access Status.
- 12=Network Rejection
- 15=CSG cell selection If the Network Rejection event is part of the current event list (as set up by the last SET UP EVENT LIST command, (see e.g., ETSI TS 102 223 v. 9.1.0), then, in the case of GERAN/UTRAN if the terminal receives a LOCATION UPDATING REJECT message or a GPRS ATTACH REJECT message or a ROUTING AREA UPDATE REJECT message or ACTIVATE PDP CONTEXT REJECT message (as defined in TS 24.008) or is unsuccessful in registering to IMS or in the case of E-UTRAN if the terminal receives an ATTACH REJECT message, TRACKING AREA UPDATE REJECT or PDN CONNECTIVITY REJECT, the terminal informs the UICC that this event has occurred, by using the ENVELOPE (EVENT DOWNLOAD—Network Rejection Event) command. The direction of the command is ME to UICC and the command header is specified in 3GPP TS 31.101. The structure of the ENVELOPE (EVENT DOWNLOAD—Network Rejection Event) command is set forth in Table 4.

Command parameters/data.

TABLE 4

| Description | Clause | M/O | Min | Length |
| --- | --- | --- | --- | --- |
| Event download tag | 9.1 | M | Y | 1 |
| Length (A + B + (C or D or I) + E + F + G + H) | — | M | Y | 1 |
| Event list | 8.25 | M | Y | A |
| Device identities | 8.7 | M | Y | B |
| Location Information | 8.19 | C | N | C |
| Routing Area Identification | 8.91 | C | N | D |
| Tracking Area Identification | 8.99 | C | N | I |
| Access Technology | 8.62 | M | Y | E |
| Update/Attach/Activation Type | 8.92 | M | Y | G |
| Rejection Cause Code | 8.93 | M | Y | H |

Event list: the Event list data object shall contain only one event (value part of length 1 byte), and terminal shall set the event to:
  Network Rejection Event.
Device identities: the terminal shall set the device identities to:
  source: Network;
  destination: UICC.
Location information: This data object shall only be present when the ME receives a LOCATION UPDATING REJECT message, and shall contain the identification (MCC, MNC, and LAC) of the rejecting network.
Routing Area Identification: This data object shall only be present when the ME receives a GPRS ATTACH REJECT message, a ROUTING AREAD UPDATE REJECT message, ACTIVATE PDP CONTEXT REJECT message and shall contain the identification (MCC, MNC, LAC and RAC) of the rejecting network.
Tracking Area Identification: This data object shall only be present when the ME receives an EMM ATTACH REJECT message, a TRACKING AREA UPDATE REJECT message or a PND CONNECTIVITY REJECT message and shall contain the identification (MCC, MNC and TAC) of the rejecting network.
Access Technology: This data object shall contain the access technology of the rejecting network Update/Attach Type/Activation: This data object contains the update, attach or activation type that was used in the registration request message.
Rejection Cause Code: This data object contains the cause code value that was received in the registration or reject message.

Response parameters/data: None for this type of ENVELOPE command.

The update, attach and activation parameters for the message are set forth in Table 5.

TABLE 5

| Byte(s) | Description | Length |
| --- | --- | --- |
| 1 | Update/Attach/Activation Type Tag | 1 |
| 2 | Length | 1 |
| 3 | Update/Attach/Activation Type | 1 |

Contents:
  In the case of GERAN/UTRAN, the terminal shall use this information as a mechanism to indicate to the UICC the location updating type that was sent in the LOCATION UPDATING REQUEST MESSAGE or the update type that was sent in the GPRS ATTACH REQUEST or ROUTING AREA UPDATING REQUEST message or PDP CONTEXT ACTIVATION REQUEST, as specified in TS 24.008.
  In the case of E-UTRAN, the terminal shall use this information as a mechanism to indicate to the UICC the EPS attach type that was sent in the ATTACH REQUEST, TRACKING AREA UPDATE REQUEST or PDN CONNECTIVITY REQUEST message, as specified in TS 24.301.
Coding:
  '00'="Normal Location Updating" in the case of a LOCATION UPDATING REQUEST message;
  '01 '="Periodic Updating" in the case of a LOCATION UPDATING REQUEST message;
  '02'="IMSI Attach" in the case of a LOCATION UPDATING REQUEST message;
  '03'="GPRS Attach" in the case of a GPRS ATTACH REQUEST message;
  '04'="Combined GPRS/IMSI Attach" in the case of a GPRS ATTACH REQUEST message;
  '05'="RA Updating" in the case of a ROUTING AREA UPDATE REQUEST message;
  '06'="Combined RA/LA Updating" in the case of a ROUTING AREA UPDATE REQUEST message;
  '07'="Combined RA/LA Updating with IMSI Attach" in the case of a ROUTING AREA UPDATE REQUEST message;
  '08'="Periodic Updating" in the case of a ROUTING AREA UPDATE REQUEST message
  '09'="EPS Attach" in the case of an EMM ATTACH REQUEST message
  '0A'="Combined EPS/IMSI Attach" in the case of an EMM ATTACH REQUEST message
  '0B'="TA updating " in the case of an EMM TRACKING AREA UPDATE REQUEST message '0C'="Combined TA/LA updating" in the case of an EMM TRACKING AREA UPDATE REQUEST message '0D'="Combined TA/LA updating with IMSI attach" in the case of an EMM TRACKING AREA UPDATE REQUEST message '0E'="Periodic updating" in the case of an EMM TRACKING AREA UPDATE REQUEST message '0F'="PDP Context Activation Request" in the case of an ACTIVATE PDP CONTEXT REQUEST message '10'="Dedicated PDN Context Activation Request" in the case of a PDN CONNECTIVITY REQUEST message All other values are reserved for future use The rejection cause code object parameters for the message are set forth in Table 6.

TABLE 6

| Byte(s) | Description | Length |
|---------|-------------|--------|
| 1 | Rejection Cause Code Tag | 1 |
| 2 | Length | 1 |
| 3 | Rejection Cause Code (Note) | 1 |

For GERAN/UTRAN, in the case of a LOCATION UPDATING REJECT message, this object contains the Reject Cause as received in the LOCATION UPDATING REJECT message. The Reject Cause is coded in the same manner as the value part of the Reject Cause information element as specified in TS 24.008

For GERAN/UTRAN, in the case of a GPRS ATTACH REJECT message or a ROUTING AREA UPDATE REJECT message, this object contains the GMM Cause as received in the GPRS ATTACH REJECT message or ROUTING AREA UPDATE REJECT message. The GMM Cause is coded in the same manner as the value part of the GMM Cause information element as specified in TS 24.008.

For GERAN/UTRAN, in the case of an ACTIVATE PDP CONTEXT REJECT message, this object contains the SM Cause as received in the ACTIVATE PDP CONTEXT REJECT message. The SM Cause is coded in the same manner as the value part of the SM Cause information element as specified in TS 24.008.

For E-UTRAN, in the case of an EMM ATTACH REJECT message or an EMM TRACKING AREA UPDATE REJECT message, this object contains the EMM Cause received in the EMM ATTACH REJECT message, EMM TRACKING AREA UPDATE REJECT message or a PDN CONNECTIVITY REJECT message. The EMM Cause is coded in the same manner as the value part of the EMM Cause information element as specified in TS 24.301.

Figure 7:
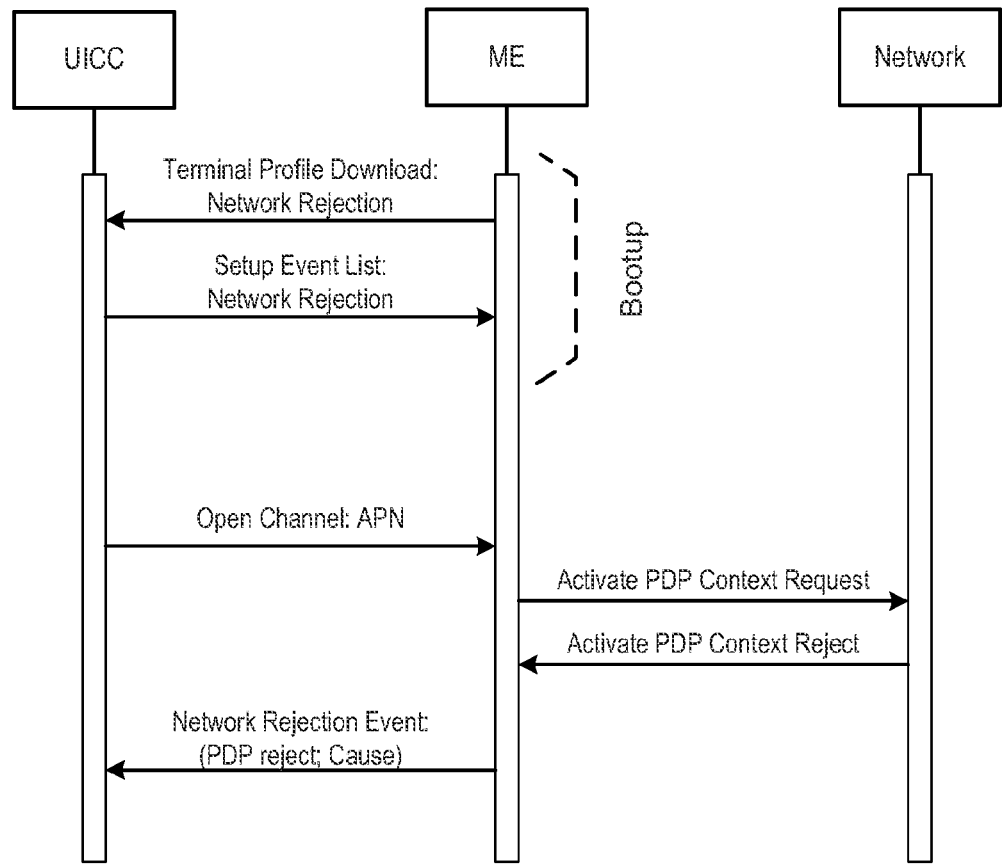
FIG. 7 shows a flow diagram of an ME notifying a UICC of a PDP context activation rejection due to a failed open channel.

Referring to FIG. 7, a flow diagram is illustrated where an ME notifies a UICC of a PDP context activation rejection due to a failed open channel. In particular, the flow diagram operates similar to the flow diagram in FIG. 6 except the UICC sends an Open Channel request to the ME.

Figure 8:
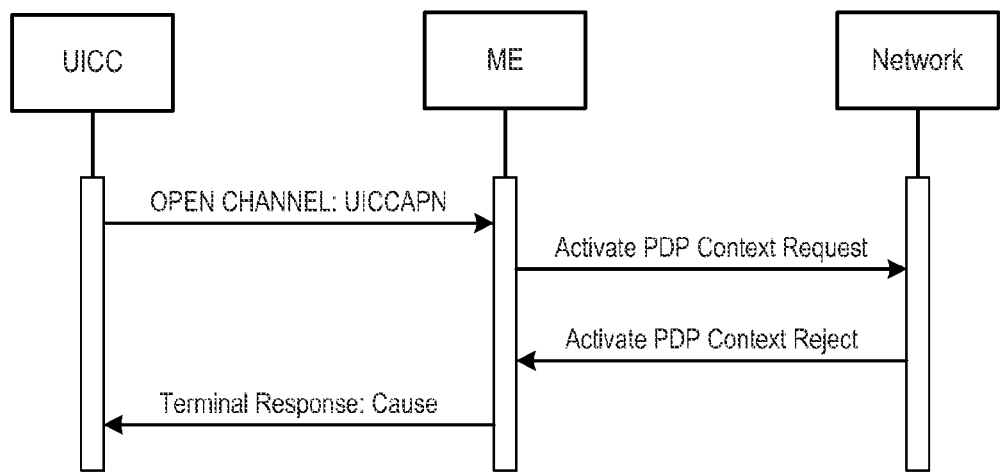
FIG. 8 shows a flow diagram of when a terminal response provides a cause of a rejection.

Referring to FIG. 8, a flow diagram for when a terminal response provides a cause of the rejection is shown. More specifically, in certain embodiments, a terminal response may be used to indicate to the UICC that there has been a specific problem with an Open Channel command via a channel status.

More specifically, the UICC sends an Open Channel command to trigger the PDP context activation procedure or the PDN connectivity procedure, the ME attempts the activation and is rejected by the network. The ME then sends a Terminal Response including a Network currently unable to process command indication and the SM cause value or EMM cause value contained within channel status as set forth within Table 6. In other embodiments, the rejection cause code TLV as described above may be used as another container in the Terminal response.

When the terminal issues a successful TERMINAL RESPONSE for a GET CHANNEL STATUS proactive command, the TERMINAL RESPONSE contains as many Channel Status data objects as there are available channels. When the terminal issues a successful TERMINAL RESPONSE for an OPEN CHANNEL command, the TERMINAL RESPONSE contains a Channel status data object for the opened channel. When the terminal issues an unsuccessful TERMINAL RESPONSE for an OPEN CHANNEL command due to the ME receiving an ACTIVATE PDP CONTEXT REJECT message or a PDN CONNECTIVITY REJECT message from the network, the TERMINAL RESPONSE contains a Channel status data object for the opened channel indicating the type of failure and the SM cause value or EMM cause value included in the ACTIVATE PDP CONTEXT REJECT message or a PDN CONNECTIVITY REJECT message received by the network. The structure of the Channel Status clause is set forth in Table 7.

TABLE 7

| Byte(s) | Description | Length |
|---------|-------------|--------|
| 1 | Channel status tag | 1 |
| 2 | Length (3) | 1 |
| 3 to 5 | Channel status | 3 |

Contents:
  The Channel status is a string of binary coded characters.
Coding:
  byte 3:
    bit 1 to 3: Channel identifier: 1 to 7;
      Channel identifier 0 means "No channel available".
    For CS, packet data service, local and Default (network) bearer:
    bit 4 to 7: RFU.
    bit 8:0=Link not established or Packet data service not activated;
      1=Link established or Packet data service activated.
    For UICC Server Mode:
    bit 4 to 6: RFU.
    bit 7, 8:00=TCP in CLOSED state;
      01=TCP in LISTEN state;
      10=TCP in ESTABLISHED state;
      11=reserved.
    For Terminal Server Mode and TCP:
    bit 4 to 6: RFU.
    bit 7, 8:00=TCP in CLOSED state;
      01=reserved;
      10=TCP in ESTABLISHED state;
      11=reserved.
    For Terminal Server Mode and UDP:
    bit 4 to 8: RFU.
  byte 4:
    '00'=No further info can be given;
    '01'=Not used;
    '02'=Not used;
    '03'=Not used;
    '04'=Not used;

'05'=Link dropped (network failure or user cancellation);
'06'=PDP/PDN Activation Rejected by the network
all other values are reserved.
byte 5 (see note):
Rejection Cause Code
Note: byte 5 shall only be set when byte 4 is set to '06'. For all other values of byte 4 it shall be set to 0xFF.

Figure 9:
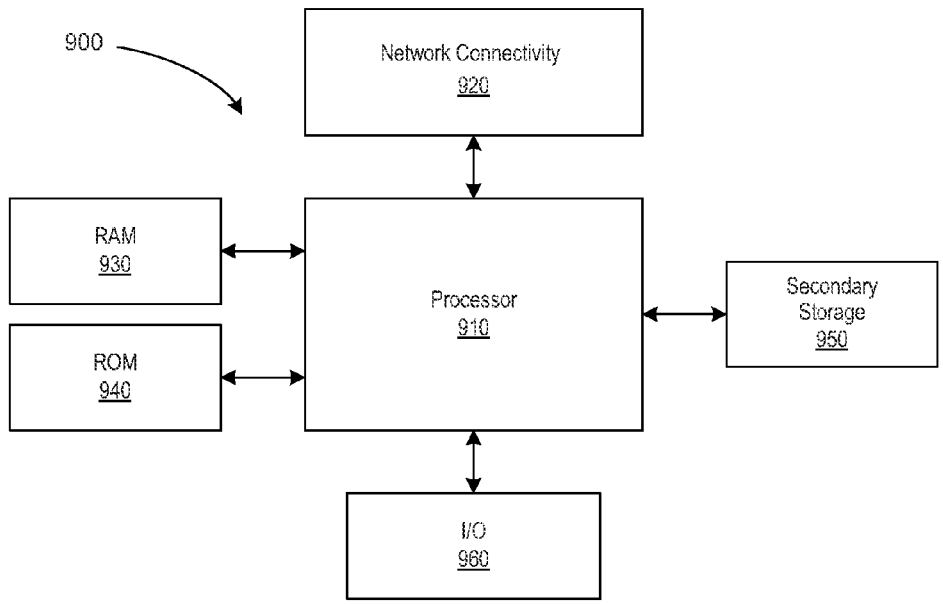
FIG. 9 depicts an exemplary system in which the present invention may be implemented.

FIG. 9 illustrates an example of a system 900 suitable for implementing one or more embodiments disclosed herein. In various embodiments, the system 900 comprises a processor 910, which may be referred to as a central processor unit (CPU) or digital signal processor (DSP), network connectivity devices 920, random access memory (RAM) 930, read only memory (ROM) 940, secondary storage 950, and input/output (I/O) devices 960. In some embodiments, some of these components may not be present or may be combined in various combinations with one another or with other components not shown. These components may be located in a single physical entity or in more than one physical entity. Any actions described herein as being taken by the processor 910 might be taken by the processor 910 alone or by the processor 910 in conjunction with one or more components shown or not shown in FIG. 9.

The processor 910 executes instructions, codes, computer programs, or scripts that it might access from the network connectivity devices 920, RAM 930, or ROM 940. While only one processor 910 is shown, multiple processors may be present. Thus, while instructions may be discussed as being executed by a processor 910, the instructions may be executed simultaneously, serially, or otherwise by one or multiple processors 910 implemented as one or more CPU chips.

In various embodiments, the network connectivity devices 920 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices (such as e.g., WCDMA, HSPA and LTE type devices), worldwide interoperability for microwave access (WiMAX) devices, and/or other well-known devices for connecting to networks. These network connectivity devices 920 may enable the processor 910 to communicate with the Internet or one or more telecommunications networks or other networks from which the processor 910 might receive information or to which the processor 910 might output information.

The network connectivity devices 920 may also be capable of transmitting or receiving data wirelessly in the form of electromagnetic waves, such as radio frequency signals or microwave frequency signals. Information transmitted or received by the network connectivity devices 920 may include data that has been processed by the processor 910 or instructions that are to be executed by processor 910. The data may be ordered according to different sequences as may be desirable for either processing or generating the data or transmitting or receiving the data.

In various embodiments, the RAM 930 may be used to store volatile data and instructions that are executed by the processor 910. The ROM 940 shown in FIG. 9 may be used to store instructions and perhaps data that are read during execution of the instructions. Access to both RAM 930 and ROM 940 is typically faster than to secondary storage 950. The secondary storage 950 is typically comprised of one or more disk drives or tape drives and may be used for non-volatile storage of data or as an over-flow data storage device if RAM 930 is not large enough to hold all working data. Secondary storage 950 may be used to store programs that are loaded into RAM 930 when such programs are selected for execution. The I/O devices 960 may include liquid crystal displays (LCDs), touch screen displays, keyboards, keypads, switches, dials, mice, track balls, voice recognizers, card readers, paper tape readers, printers, video monitors, or other well-known input/output devices.

Figure 10:
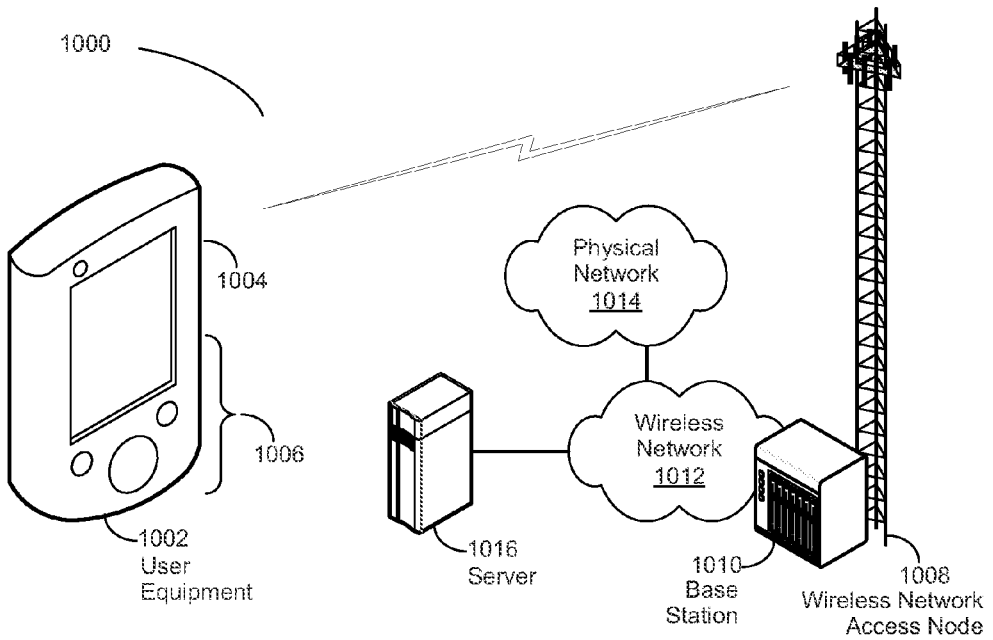
FIG. 10 shows a wireless communications system including an embodiment of a user equipment (UE).

FIG. 10 shows a wireless communications system including an embodiment of user equipment (UE) 1002. Though illustrated as a mobile phone, the UE 1002 may take various forms including a wireless handset, a pager, a personal digital assistant (PDA), a portable computer, a tablet computer, or a laptop computer. Many suitable devices combine some or all of these functions. In some embodiments, the UE 1002 is not a general purpose computing device like a portable, laptop or tablet computer, but rather is a special-purpose communications device such as a mobile phone, a wireless handset, a pager, a PDA, or a telecommunications device installed in a vehicle. The UE 1002 may likewise be a device, include a device, or be included in a device that has similar capabilities but that is not transportable, such as a desktop computer, a set-top box, or a network node. In these and other embodiments, the UE 1002 may support specialized activities such as gaming, inventory control, job control, and/or task management functions, and so on.

In various embodiments, the UE 1002 includes a display 1004. The UE 1002 likewise includes a touch-sensitive surface, a keyboard or other input keys 1006 generally used for input by a user. In these and other environments, the keyboard may be a full or reduced alphanumeric keyboard such as QWERTY, Dvorak, AZERTY, and sequential keyboard types, or a traditional numeric keypad with alphabet letters associated with a telephone keypad. The input keys may likewise include a trackwheel, an exit or escape key, a trackball, and other navigational or functional keys, which may be inwardly depressed to provide further input function. The UE 1002 may likewise present options for the user to select, controls for the user to actuate, and cursors or other indicators for the user to direct.

The UE 1002 may further accept data entry from the user, including numbers to dial or various parameter values for configuring the operation of the UE 1002. The UE 1002 may further execute one or more software or firmware applications in response to user commands. These applications may configure the UE 1002 to perform various customized functions in response to user interaction. Additionally, the UE 1002 may be programmed or configured over-the-air (OTA), for example from a wireless base station 1010, a server 1016, a wireless network access node 1008, or a peer UE 1002.

Among the various applications executable by the UE 1000 are a web browser, which enables the display 1004 to display a web page. The web page may be obtained via wireless communications with a wireless network access node 1008, such as a cell tower, a peer UE 1002, or any other wireless communication network 1012 or system. In various embodiments, the wireless network 1012 is coupled to a wired network 1014, such as the Internet. Via the wireless network 1012 and the wired network 1014, the UE 1002 has access to information on various servers, such as a server 1016. The server 1016 may provide content that may be shown on the display 1004. Alternately, the UE 1002 may access the wireless network 1012 through a peer UE 1002 acting as an intermediary, in a relay type or hop type of connection. Skilled practitioners of the art will recognized that many such embodiments are possible and the foregoing is not intended to limit the spirit, scope, or intention of the disclosure.

Figure 11:
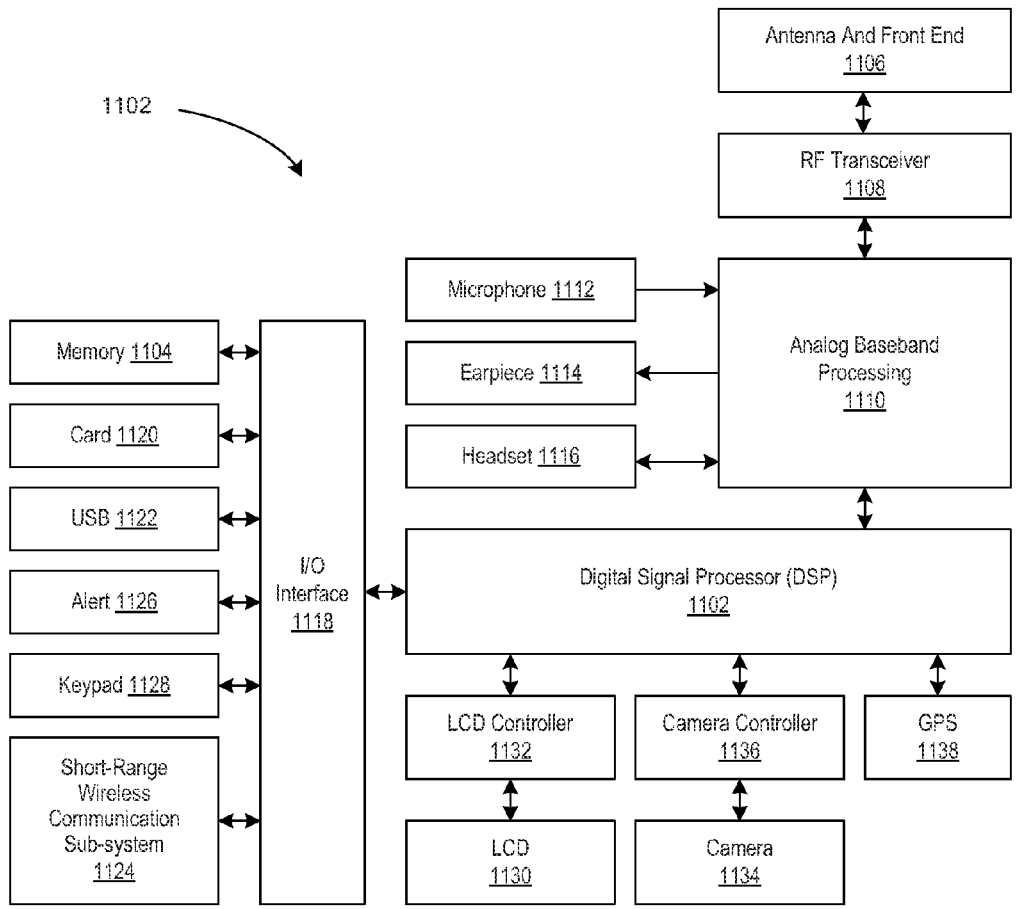
FIG. 11 is a simplified block diagram of an exemplary UE comprising a digital signal processor (DSP).

FIG. 11 depicts a block diagram of an exemplary user equipment (UE) 1102 in which the present invention may be implemented. While various components of a UE 1002 are depicted, various embodiments of the UE 1002 may include a subset of the listed components or additional components not listed. As shown in FIG. 11, the UE 1002 includes a digital signal processor (DSP) 1102 and a memory 1104. As shown, the UE 1002 may further include an antenna and front end unit 1106, a radio frequency (RF) transceiver 1108, an analog baseband processing unit 1110, a microphone 1112, an earpiece speaker 1114, a headset port 1116, an input/output (I/O) interface 1118, a removable memory card 1120, a universal serial bus (USB) port 1122, a short range wireless communication sub-system 1124, an alert 1126, a keypad 1128, a liquid crystal display (LCD) 1130, which may include a touch sensitive surface, an LCD controller 1132, a charge-coupled device (CCD) camera 1134, a camera controller 1136, and a global positioning system (GPS) sensor 1138. In various embodiments, the UE 1002 may include another kind of display that does not provide a touch sensitive screen. In an embodiment, the DSP 1202 may communicate directly with the memory 1104 without passing through the input/output interface 1118.

In various embodiments, the DSP 1102 or some other form of controller or central processing unit (CPU) operates to control the various components of the UE 1002 in accordance with embedded software or firmware stored in memory 1104 or stored in memory contained within the DSP 1102 itself In addition to the embedded software or firmware, the DSP 1102 may execute other applications stored in the memory 1104 or made available via information carrier media such as portable data storage media like the removable memory card 1120 or via wired or wireless network communications. The application software may comprise a compiled set of machine-readable instructions that configure the DSP 1102 to provide the desired functionality, or the application software may be high-level software instructions to be processed by an interpreter or compiler to indirectly configure the DSP 1102.

The antenna and front end unit 1106 may be provided to convert between wireless signals and electrical signals, enabling the UE 1002 to send and receive information from a cellular network or some other available wireless communications network or from a peer UE 1002. In an embodiment, the antenna and front end unit 1006 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 1106 may include antenna tuning or impedance matching components, RF power amplifiers, or low noise amplifiers.

In various embodiments, the RF transceiver 1108 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 1110 or the DSP 1102 or other central processing unit. In some embodiments, the RF Transceiver 1108, portions of the Antenna and Front End 1106, and the analog base band processing unit 1110 may be combined in one or more processing units and/or application specific integrated circuits (ASICs).

The analog baseband processing unit 1110 may provide various analog processing of inputs and outputs, for example analog processing of inputs from the microphone 1112 and the headset 1116 and outputs to the earpiece 1114 and the headset 1116. To that end, the analog baseband processing unit 1110 may have ports for connecting to the built-in microphone 1112 and the earpiece speaker 1114 that enable the UE 1002 to be used as a cell phone. The analog baseband processing unit 1110 may further include a port for connecting to a headset or other hands-free microphone and speaker configuration. The analog baseband processing unit 1110 may provide digital-to-analog conversion in one signal direction and analog-to-digital conversion in the opposing signal direction. In various embodiments, at least some of the functionality of the analog baseband processing unit 1110 may be provided by digital processing components, for example by the DSP 1102 or by other central processing units.

The DSP 1102 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 1102 may perform modulation, coding, interleaving, and spreading, and for a receiver function the DSP 1102 may perform despreading, deinterleaving, decoding, and demodulation. In another embodiment, for example in an orthogonal frequency division multiplex access (OFDMA) technology application, for the transmitter function the DSP 1102 may perform modulation, coding, interleaving, inverse fast Fourier transforming, and cyclic prefix appending, and for a receiver function the DSP 1102 may perform cyclic prefix removal, fast Fourier transforming, deinterleaving, decoding, and demodulation. In other wireless technology applications, yet other signal processing functions and combinations of signal processing functions may be performed by the DSP 1102.

The DSP 1102 may communicate with a wireless network via the analog baseband processing unit 1110. In some embodiments, the communication may provide Internet connectivity, enabling a user to gain access to content on the Internet and to send and receive e-mail or text messages. The input/output interface 1118 interconnects the DSP 1102 and various memories and interfaces. The memory 1104 and the removable memory card 1120 may provide software and data to configure the operation of the DSP 1102. Among the interfaces may be the USB interface 1122 and the short range wireless communication sub-system 1124. The USB interface 1122 may be used to charge the UE 1002 and may also enable the UE 1002 to function as a peripheral device to exchange information with a personal computer or other computer system. The short range wireless communication sub-system 1124 may include an infrared port, a Bluetooth interface, an IEEE 802.11 compliant wireless interface, or any other short range wireless communication sub-system, which may enable the UE 1002 to communicate wirelessly with other nearby mobile devices and/or wireless base stations.

The input/output interface 1118 may further connect the DSP 1102 to the alert 1126 that, when triggered, causes the UE 1002 to provide a notice to the user, for example, by ringing, playing a melody, or vibrating. The alert 1126 may serve as a mechanism for alerting the user to any of various events such as an incoming call, a new text message, and an appointment reminder by silently vibrating, or by playing a specific pre-assigned melody for a particular caller.

The keypad 1128 couples to the DSP 1102 via the I/O interface 1118 to provide one mechanism for the user to make selections, enter information, and otherwise provide input to the UE 1002. The keyboard 1128 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 1130, which may include touch screen capability and also display text and/or graphics to the user. The LCD controller 1132 couples the DSP 1102 to the LCD 1130.

The CCD camera 1134, if equipped, enables the UE 1002 to take digital pictures. The DSP 1102 communicates with the CCD camera 1134 via the camera controller 1136. In another embodiment, a camera operating according to a technology other than Charge Coupled Device cameras may be employed. The GPS sensor 1138 is coupled to the DSP 1102 to decode global positioning system signals, thereby enabling the UE 1002 to determine its position. Various other peripherals may also be included to provide additional functions, such as radio and television reception.

Figure 12:
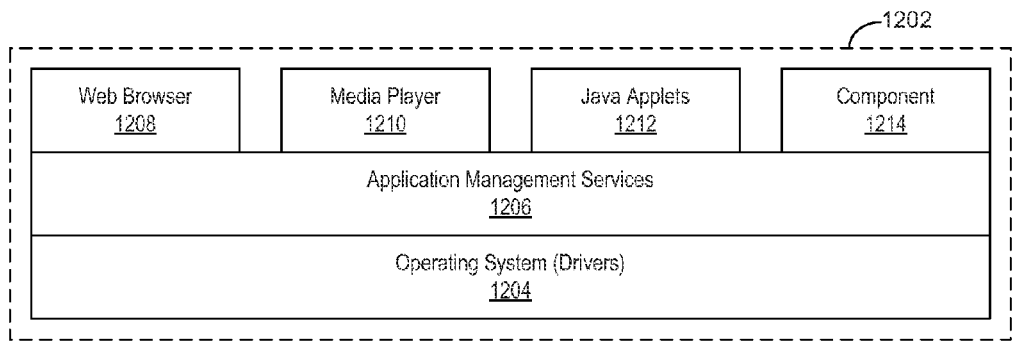
FIG. 12 is a simplified block diagram of a software environment that may be implemented by the DSP.

FIG. 12 illustrates a software environment 1202 that may be implemented by the DSP 1102. The DSP 1102 executes operating system drivers 1204 that provide a platform from which the rest of the software operates. The operating system drivers 1204 provide drivers for the UE 1202 hardware with standardized interfaces that are accessible to application software. The operating system drivers 1204 include application management services (AMS) 1206 that transfer control between applications running on the UE 1202. Also shown in FIG. 12 are a web browser application 1208, a media player application 1210, and Java applets 1212. The web browser application 1208 configures the UE 1002 to operate as a web browser, allowing a user to enter information into forms and select links to retrieve and view web pages. The media player application 1210 configures the UE 1002 to retrieve and play audio or audiovisual media. The Java applets 1212 configure the UE 1002 to provide games, utilities, and other functionality. A component 1214 might provide functionality described herein. The UE 1002, a base station 1010, and other components described herein might include a processing component that is capable of executing instructions related to the actions described above.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes. Also, as used herein, the term UE refers to a device which includes a memory card whereas a device which does not include a memory card is generally referred to as an ME. In other words, a UE is the combination of an ME with a memory card.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A method, comprising:
triggering a packet data protocol (PDP) context activation procedure in response to receiving, from a universal integrated circuit card (UICC), an Open Channel command;
receiving, by a mobile equipment (ME), an ACTIVATE PDP CONTEXT REJECT message including a session management (SM) cause; and
providing, at an Internet Protocol Multimedia Subsystem (IMS) layer, the UICC with a USIM Application Toolkit (USAT) network rejection event comprising an Access Point Name (APN) and the SM cause received by the mobile equipment (ME).

2. The method of claim 1 further comprising:
monitoring, via the UICC, all rejections; and,
selecting via an Open Channel command an alternative APN to activate based upon the monitoring.

3. The method of claim 1 further comprising:
using a terminal response to indicate to the UICC that there has been a specific problem with an Open Channel command.

4. The method of claim 3 further comprising:
providing via the ME, during an Open Channel procedure, the terminal response to acknowledge the Open Channel command.

5. The method of claim 4 further comprising:
adding, via the ME, the activate PDP context reject cause received from a network to a Terminal response message.

6. An apparatus, comprising:
a memory coupled to one or more hardware processors configured to:
trigger a Packet Data Network (PDN)context activation procedure in response to receiving, from a universal integrated circuit card (UICC), an Open Channel command;
receive an ACTIVATE PDP CONTEXT REJECT message including a session management (SM) cause; and
provide, at an Internet Protocol Multimedia Subsystem (IMS) layer, the UICC with a USIM Application Toolkit (USAT) network rejection event comprising an Access Point Name (APN) and the SM cause received by a mobile equipment (ME).

7. The apparatus of claim 6 the one or more hardware processors further configured to:
monitor, via the UICC, all rejections; and,
select via an Open Channel command an alternate APN to activate based upon the monitoring.

8. The apparatus of claim 6 the one or more hardware processors further configured to:
use a terminal response to indicate to the UICC that there has been a specific problem with an Open Channel command.

9. The apparatus of claim 8 the one or more hardware processors further configured to:
provide via the ME, during an Open Channel procedure, the terminal response to acknowledge the Open Channel command.

10. The apparatus of claim 9 the one or more hardware processors further configured to:
add, via the ME, the activate PDP context reject cause received from a network to a Terminal response message.

11. A method, comprising:
triggering a Packet Data Network (PDN) connectivity procedure in response to receiving, from a universal integrated circuit card (UICC), an Open Channel command;
receiving, by a mobile equipment (ME), a PDN CONNECTIVITY REJECT message including a PDN Connectivity Reject cause; and
providing, at an Internet Protocol Multimedia Subsystem (IMS) layer, the UICC with a USIM Application Toolkit (USAT) network rejection event comprising an Access Point Name (APN) and the PDN Connectivity Reject cause received by the mobile equipment (ME).

12. The method of claim 11 further comprising:
monitoring, via the UICC, all rejections; and,
selecting via an Open Channel command an alternate APN to activate based upon the monitoring.

13. The method of claim 11 further comprising:
using a terminal response to indicate to the UICC that there has been a specific problem with an Open Channel command.

14. The method of claim 13 further comprising:
providing via the ME, during an Open Channel procedure, the terminal response to acknowledge the Open Channel command.

15. The method of claim 14 further comprising:
adding, via the ME, the PDN Connectivity Reject cause received from a network to a Terminal response message.

16. An apparatus, comprising:
a memory coupled to one or more hardware processors configured to:
trigger a Packet Data Network (PDN) connectivity procedure in response to receiving, from a universal integrated circuit card (UICC), an Open Channel command;
receive, by a mobile equipment (ME), a PDN CONNECTIVITY REJECT message including a PDN Connectivity Reject cause; and
provide, at an Internet Protocol Multimedia Subsystem (IMS) layer, the UICC with a USIM Application Toolkit (USAT) network rejection event comprising an Access Point Name (APN) and the PDN Connectivity Reject cause received by the mobile equipment (ME).

17. The apparatus of claim 16 the one or more hardware processors further configured to:
monitor, via the UICC, all rejections; and,
select via an Open Channel command an alternate APN to activate based upon the monitoring.

18. The apparatus of claim 16 the one or more hardware processors further configured to:
use a terminal response to indicate to the UICC that there has been a specific problem with an Open Channel command.

19. The apparatus of claim 18 the one or more hardware processors further configured to:
provide via the ME, during an Open Channel procedure, the terminal response to acknowledge the Open Channel command.

20. The apparatus of claim 19 the one or more hardware processors further configured to:
add, via the ME, the PDN Connectivity Reject cause received from a network to a Terminal response message.

* * * * *